(12) United States Patent
Kweon et al.

(10) Patent No.: US 8,150,596 B2
(45) Date of Patent: Apr. 3, 2012

(54) FUEL IGNITION QUALITY DETECTION

(75) Inventors: Chol-Bum M Kweon, Rochester, MI (US); Frederic Anton Matekunas, Troy, MI (US); Paul Anthony Battiston, Clinton Township, MI (US); Donald Terry French, Warren, MI (US); Ibrahim Haskara, MaComb, MI (US); Yue-Yun Wang, Troy, MI (US)

(73) Assignee: GM Global Technology Operations LLC

( * ) Notice: Subject to any disclaimer, the term of this patent is extended or adjusted under 35 U.S.C. 154(b) by 916 days.

(21) Appl. No.: 12/177,340

(22) Filed: Jul. 22, 2008

(65) Prior Publication Data
US 2009/0299605 A1    Dec. 3, 2009

Related U.S. Application Data

(60) Provisional application No. 61/058,059, filed on Jun. 2, 2008.

(51) Int. Cl.
*F02D 41/30* (2006.01)
*G06F 19/00* (2011.01)

(52) U.S. Cl. ..................................................... 701/103

(58) Field of Classification Search .......... 701/103–105, 701/102; 123/478, 435, 480, 445
See application file for complete search history.

(56) References Cited

U.S. PATENT DOCUMENTS

| | | | |
|---|---|---|---|
| 5,457,985 A | 10/1995 | Cellier et al. | |
| 6,125,690 A | 10/2000 | Kitching | |
| 6,155,101 A | 12/2000 | Renault et al. | |
| 6,609,413 B1 | 8/2003 | De Craecker | |
| 6,662,116 B2 | 12/2003 | Brown | |
| 7,047,933 B2 * | 5/2006 | Gray, Jr. | 123/305 |
| 7,360,525 B2 * | 4/2008 | Yamaguchi et al. | 123/478 |
| 7,617,038 B2 * | 11/2009 | Yamaguchi et al. | 701/103 |
| 2007/0163542 A1 | 7/2007 | Kettl et al. | |
| 2009/0099754 A1 | 4/2009 | Reuss et al. | |

FOREIGN PATENT DOCUMENTS

| | | |
|---|---|---|
| DE | 10143509 A1 | 4/2003 |
| DE | 102007048650 | 4/2009 |
| EP | 1775584 A2 | 4/2007 |
| JP | 2006016994 A | 1/2006 |
| JP | 2008-82227 A * | 4/2008 |

* cited by examiner

*Primary Examiner* — Hieu T Vo (57) ABSTRACT

An engine control system comprises a fuel diagnostic module and a fuel control module. The fuel diagnostic module determines a pressure-ratio difference average (PRDA) based on a pressure in at least one cylinder and determines a cetane number (CN) of a fuel based on the PRDA. The fuel control module actuates fuel injectors based on the CN.

19 Claims, 8 Drawing Sheets

FUEL IGNITION QUALITY DETECTION

CROSS-REFERENCE TO RELATED APPLICATIONS

This application claims the benefit of U.S. Provisional Application No. 61/058,059, filed on Jun. 2, 2008. The disclosure of the above application is incorporated herein by reference.

FIELD

The present disclosure relates to engine fuel detection and control and more particularly to engine fuel detection and control in a compression ignition (CI) engine system.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Cetane number (CN) is a measurement of the ignition (i.e., combustion) quality of compression ignition (CI) fuel (e.g., diesel fuel) during compression ignition. In particular, CN affects the ignition delay of CI fuel (i.e., the time period between the start of injection of fuel into an CI engine and the start of combustion of an air/fuel mixture in the CI engine). CI fuels with higher CNs tend to have shorter ignition delays (and hence less time for the air/fuel mixture to form) than CI fuels with lower CNs.

CI fuel may be found with a wide range of CNs. For example, different countries require different minimum CNs and the diesel fuel grade at service stations may have a wide range of CNs. However, current CI engine systems are calibrated to use CI fuel with a certain CN. Operating an CI engine on CI fuel with a different CN may affect, for example, combustion, exhaust pressure, boost pressure, exhaust gas recirculation (EGR), and/or an air/fuel ratio. Further, burning CI fuel with a different CN than calibrated may increase, for example, emissions and/or noise.

SUMMARY

An engine control system comprises a fuel diagnostic module and a fuel control module. The fuel diagnostic module determines a pressure-ratio difference average (PRDA) based on a pressure in at least one cylinder and determines a cetane number (CN) of a fuel based on the PRDA. The fuel control module actuates fuel injectors based on the CN.

A method of operating an engine control system comprises determining a pressure-ratio difference average (PRDA) based on a pressure in at least one cylinder; determining a cetane number (CN) of a fuel based on the PRDA; and actuating fuel injectors based on the CN.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

The compression ignition (CI) engine system of the present disclosure detects a cetane number (CN) of CI fuel. The CI engine system detects the CN based on a pressure-ratio difference average (PRDA). The PRDA is determined based on a pressure in at least one cylinder. The CI engine system may adjust various calibrations based on the detected CN.

Figure 1:
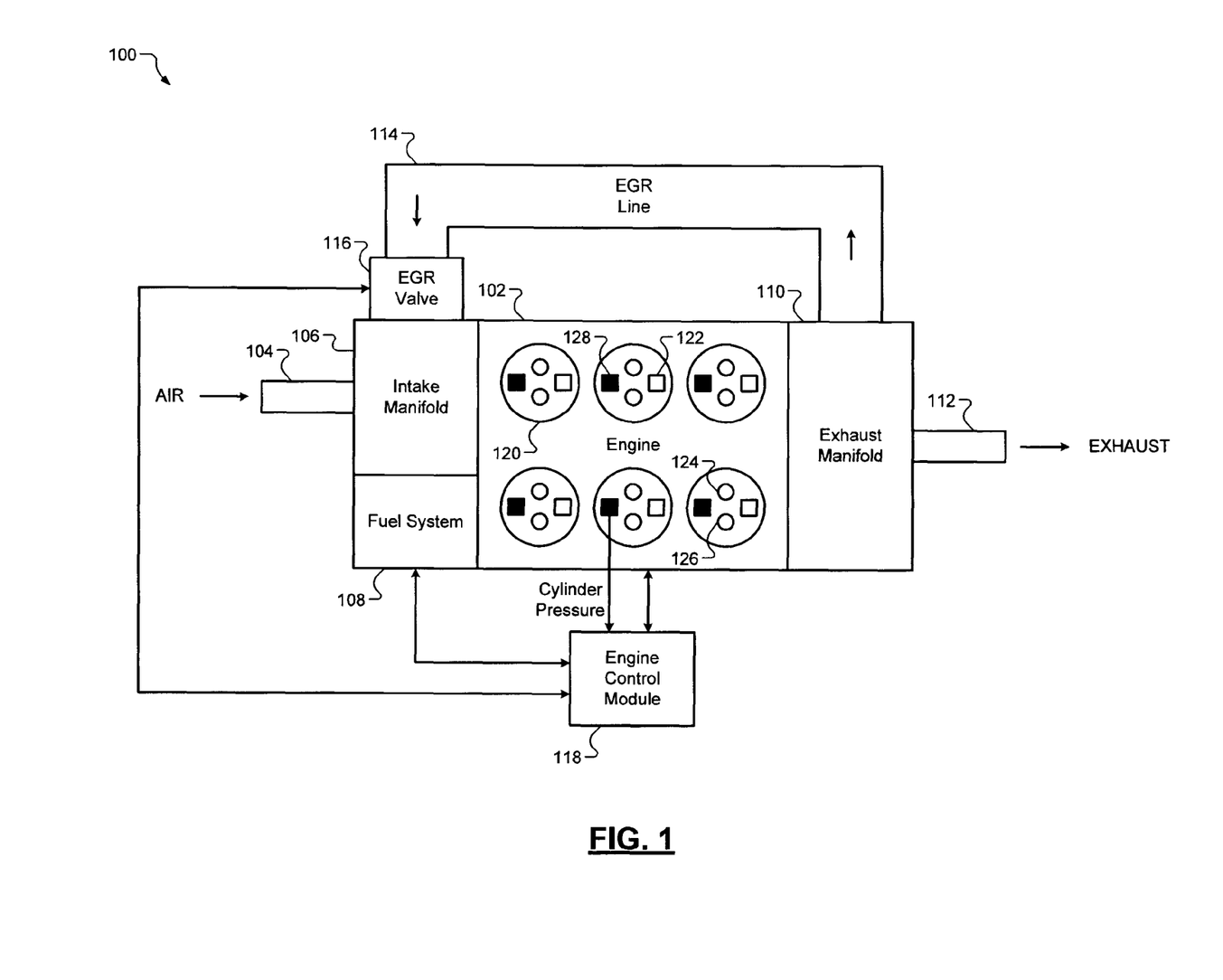
FIG. 1 is a functional block diagram of an exemplary implementation of a compression ignition (CI) engine system according to the principles of the present disclosure.

Referring to FIG. 1, an exemplary implementation of an CI engine system 100 is shown. An CI engine 102 combusts an air/fuel mixture to produce drive torque. The CI engine system 100 further includes an inlet 104, an intake manifold 106, a fuel system 108, an exhaust manifold 110, an outlet 112, an exhaust gas recirculation (EGR) line 114, an EGR valve 116, and an engine control module 118. The CI engine 102 includes cylinders 120, fuel injectors 122, intake valves 124, exhaust valves 126, and pressure sensors 128.

Air is drawn into the intake manifold 106 through the inlet 104. Air within the intake manifold 106 is distributed into the cylinders 120. Although FIG. 1 depicts six cylinders, it should be appreciated that the CI engine 102 may include additional or fewer cylinders. For example, engines having 3, 4, 5, 6, 10, 12 and 16 cylinders are contemplated.

The fuel system 108 includes a fuel pump (not shown) to pressurize fuel and a fuel rail (not shown) to deliver fuel to the fuel injectors 122. The fuel injectors 122 are operated by commanding an energizing time. For example only, an amount of fuel injection may be based on a fuel rail pressure, the energizing time, and/or fuel injector construction. For example only, a timing of fuel injection may be based on a position of pistons (not shown) within the cylinders 120 (i.e., a crank angle) when the fuel injectors 122 start to operate.

The engine control module 118 communicates with components of the CI engine system 100, such as the CI engine 102, the fuel system 108, and associated sensors as described herein. The engine control module 118 electronically controls the fuel injectors 122 to inject fuel into the cylinders 120. The intake valves 124 selectively open and close to enable air to enter the cylinders 120. A camshaft (not shown) regulates intake valve positions. The pistons compress the air/fuel mixture within the cylinders 120 to cause combustion.

The pressure sensors 128 are situated such that a pressure in each of the cylinders 120 (i.e., a cylinder pressure) may be measured. The pressure sensors 128 may provide measurements throughout an engine cycle. The cylinder pressure over a particular crank angle after top dead center (aTDC) may be measured. Top dead center is the position of the pistons in which they are furthest from the crankshaft.

The pistons drive a crankshaft (not shown) to produce drive torque. Combustion exhaust within the cylinders 120 may be forced out through the exhaust manifold 110 and the outlet 112 when at least one of the exhaust valves 126 are in an open position. A camshaft (not shown) regulates exhaust valve positions.

The EGR line 114 and the EGR valve 116 may introduce exhaust gas into the intake manifold 106. The EGR valve 116 is mounted on the intake manifold 106 and the EGR line 114 extends from the exhaust manifold 110 to the EGR valve 116. The EGR line 114 transfers exhaust gas from the exhaust manifold 110 to the EGR valve 116. The engine control module 118 electronically controls a position of the EGR valve 116.

Figure 2:
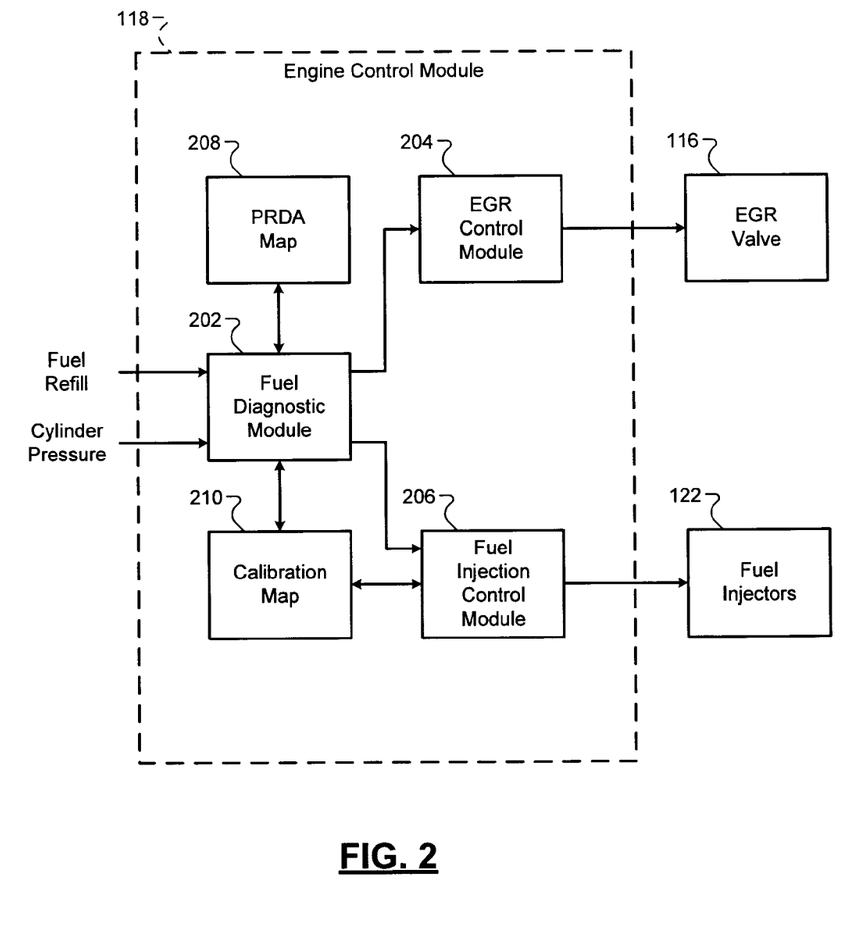
FIG. 2 is a functional block diagram of an exemplary implementation of an engine control module according to the principles of the present disclosure.

Referring now to FIG. 2, an exemplary implementation of the engine control module 118 is shown. The engine control module 118 includes a fuel diagnostic module 202, an EGR control module 204, a fuel injection control module 206, a calibration map 210, and an PRDA map 208. The fuel diagnostic module 202 receives a fuel refill signal from a fuel level sensor (not shown) or a motion sensor (not shown) that is located within a fuel tank (not shown). The fuel refill signal indicates whether the fuel tank has been refilled with new fuel. The fuel diagnostic module 202 further receives the cylinder pressure from at least one of the pressure sensors 128.

To avoid being noticed by a driver of a vehicle, the fuel diagnostic module 202 may detect an CN of the fuel in the fuel tank during deceleration over-runs (i.e., when the fuel system 108 is shut off). When the fuel refill signal indicates that the fuel tank has been refilled with the new fuel, the fuel diagnostic module 202 starts to detect the CN of the fuel. The fuel diagnostic module 202 may command a display (not shown) of the vehicle to display a graphic or text that indicates to the driver that the CN of the fuel is being detected. For example only, the text may include, but is not limited to, "Detecting CN" and/or "Fuel Sensing."

If the EGR in the CI engine system 100 does not vary or is known, the fuel diagnostic module 202 may detect the CN of the fuel with the EGR as calibrated. For example only, if the fuel is injected into only one cylinder, the CN of the fuel may be detected with the EGR as calibrated because combustion in only one cylinder has a negligible effect on the EGR. However, if the EGR varies or is unknown, the fuel diagnostic module 202 commands the EGR control module 204 to close the EGR valve 116 when the CN of the fuel is being detected. The varying EGR may affect combustion. When the EGR valve 116 is closed, the fuel diagnostic module 202 commands a turbocharger control module (not shown) to control a turbocharger vane (not shown) to maintain a consistent manifold air pressure.

The fuel diagnostic module 202 determines CN detection settings based on predetermined values in the calibration map 210. The CN detection settings include at least one crank angle window, an engine speed, a fuel rail pressure, a pilot quantity (i.e., an amount of fuel injection), and at least one pilot timing (i.e., a timing of fuel injection). The crank angle window is a range of crank angles aTDC where the fuel diagnostic module 202 samples the cylinder pressure.

The fuel diagnostic module 202 commands the CI engine 102 to operate at the engine speed (not shown). The pistons run for an engine cycle in which fuel is not injected (i.e., a motored cycle). The fuel diagnostic module 202 determines a measured motored pressure based on the cylinder pressure sampled during the motored cycle.

After the motored cycle, the fuel diagnostic module 202 commands the fuel system 108 to operate based on the fuel rail pressure (not shown). The fuel diagnostic module 202 commands the fuel injection control module 206 to control at least one of the fuel injectors 122 based on the pilot quantity and the pilot timing. The pistons run for an engine cycle in which fuel is injected (i.e., a fired or fueled cycle). The fuel diagnostic module 202 determines a fired pressure based on the cylinder pressure sampled during the fired cycle.

The fuel diagnostic module 202 determines a motored pressure ratio based on a ratio of the measured motored pressure to an estimated motored pressure. The fuel diagnostic module 202 may determine the estimated motored pressure. In various implementations, the estimated motored pressure may be determined as described in commonly assigned U.S. Pat. No. 4,621,603, issued on Nov. 11, 1986 and entitled "Engine Combustion Control with Fuel Balancing by Pressure Ratio Management," the disclosure of which is expressly incorporated herein by reference in its entirety. The fuel diagnostic module 202 determines a fired pressure ratio based on a ratio of the fired pressure to the estimated motored pressure.

The fuel diagnostic module 202 determines a pressure-ratio difference based on the motored pressure ratio and the corresponding fired pressure ratio. The measured motored pressure corresponds to the fired pressure if each is sampled at the same crank angle aTDC. The pressure-ratio difference PRD is determined according to the following equation:

$$PRD = PR_{fired} - PR_{motored}, \quad (1)$$

where $PR_{fired}$ is the fired pressure ratio and $PR_{motored}$ is the motored pressure ratio.

The fuel diagnostic module 202 determines the PRDA based on the PRD at each crank angle aTDC of the crank angle window. The pressure-ratio difference average PRDA is determined according to the following equation:

$$PRDA = \sum_{m=n}^{o} PRD_m / \text{samples}, \quad (2)$$

where n is a minimum of the crank angle window, o is a maximum of the crank angle window, and samples is a total number of samples in the crank angle window. Determining the PRDA based on the motored pressure ratio minimizes the effects of in-cylinder heat-loss, crank angle offsets, a compression ratio of the cylinder, and noise induced on the pressure sensor.

If the fuel diagnostic module 202 commands fuel injection and samples the cylinder pressure based on two different pilot timings, the fuel diagnostic module 202 may determine a relative PRDA. The relative PRDA is a difference between a first PRDA with a first pilot timing (e.g., −5 degrees aTDC) and a second PRDA with a second pilot timing (e.g., −24 degrees aTDC).

The fuel diagnostic module 202 determines the CN of the fuel in the fuel tank based on the PRDA map 208 that relates either the PRDA or the relative PRDA to the CN. For example only, the PRDA map 208 may include the look-up table of FIG. 7 that relates the PRDA to an CN of an CI fuel (e.g., a diesel fuel). In another exemplary implementation, the PRDA map 208 may include the look-up table of FIG. 8 that relates the relative PRDA to an CN of an CI fuel.

In another exemplary implementation, the PRDA map 208 may include a function that relates either the PRDA or the relative PRDA to an CN of an CI fuel. In another exemplary implementation, the PRDA map 208 may include a look-up table and/or a function that relates the PRDA to an CN of an alternative CI fuel or a mixture of CI fuels and alternative CI fuels. For example only, the alternative CI fuels may include, but are not limited to, biodiesels, Fisher-Tropsch (F-T) diesel fuels, dimethyl ether (DME), and/or ethanol fuels.

The calibration map 210 includes at least one look-up table that relates a mass burnt fraction (MBF) to a combustion phasing target (in CAD aTDC) for the fuel injection control module 206. For example only, these look-up tables may be for, but are not limited to, CI fuels, alternative CI fuels, and/or mixtures of the two, with different CNs. If the calibration map 210 includes multiple look-up tables, the fuel injection control module 206 uses the look-up table for the fuel with the CN detected by the fuel diagnostic module 202.

If the calibration map 210 includes only one look-up table, the fuel diagnostic module 202 shifts the look-up table based on the detected CN. If the detected CN is less than the CN of the look-up table, the look-up table is advanced (i.e., the combustion phasing targets are advanced, decreased). If the detected CN is greater than the CN of the look-up table, the look-up table is retarded (i.e., the combustion phasing targets are retarded, or increased). The fuel diagnostic module 202 sets the CN of the look-up table to the detected CN. The fuel injection control module 206 uses the look-up table to control the fuel injectors 122.

Figure 3:
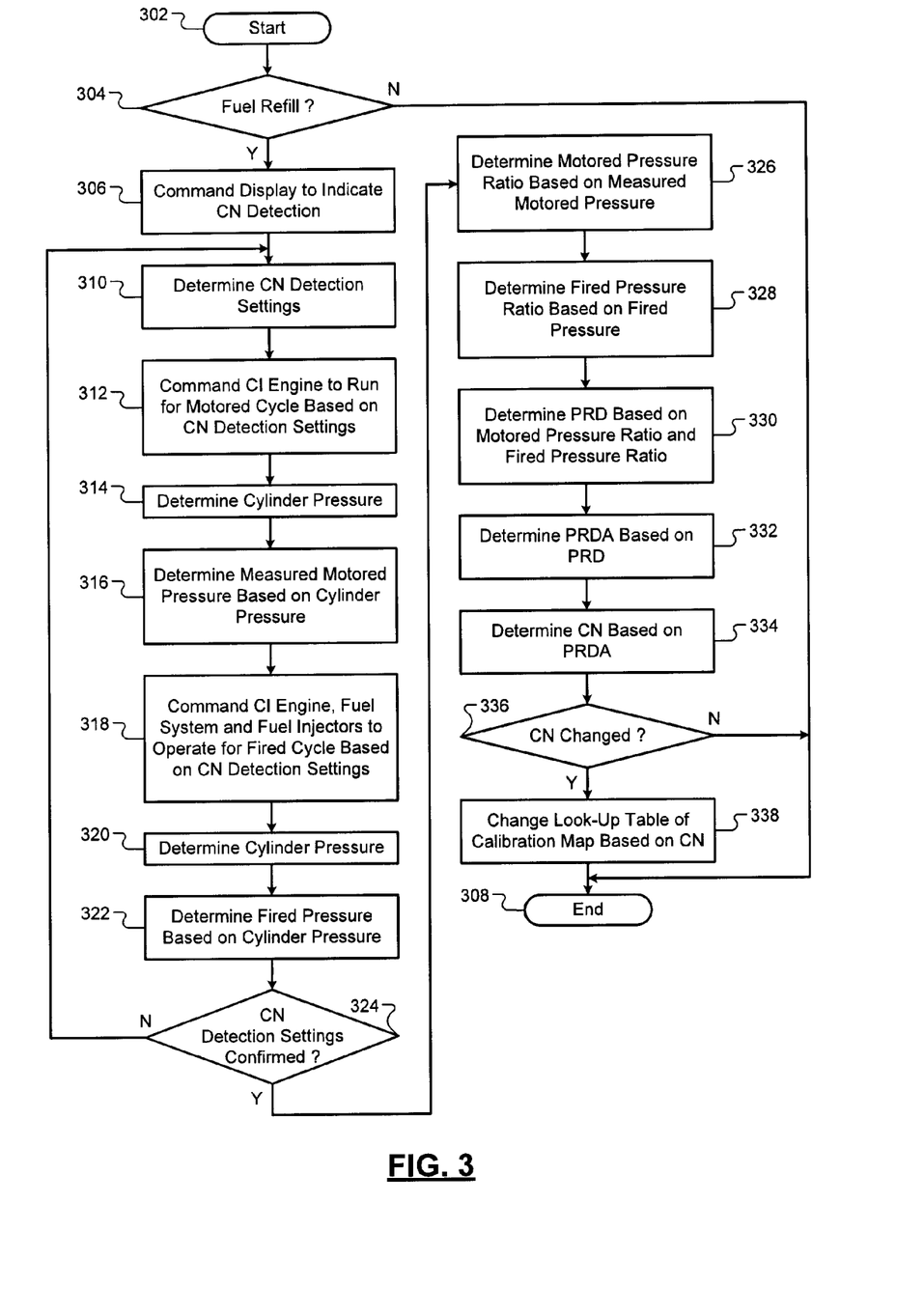
FIG. 3 is a flowchart depicting exemplary steps performed by the engine control module according to the principles of the present disclosure.

Referring now to FIG. 3, a flowchart depicting exemplary steps performed by the engine control module 118 is shown. Control begins in step 302. In step 304, control determines whether the fuel refill signal indicates that the fuel tank has been refilled with new fuel. If true, control continues in step 306. If false, control continues in step 308.

In step 306, the display is commanded to display the graphic or the text that indicates to the driver that the CN of the fuel is being detected. For example only, the text may include, but is not limited to, "Detecting CN" and/or "Fuel Sensing." In step 310, the CN detection settings are determined. In step 312, the CI engine 102 is commanded to run for the motored cycle based on the CN detection settings.

In step 314, the cylinder pressure is determined. In step 316, the measured motored pressure is determined based on the cylinder pressure. In step 318, the CI engine 102, the fuel system 108, and the fuel injectors 122 to operate for the fired cycle based on the CN detection settings.

In step 320, the cylinder pressure is determined. In step 322, the fired pressure is determined based on the cylinder pressure. In step 324, control determines whether the CN detection settings are confirmed. For example only, the CN detection settings may be confirmed when the differences between the measured CN detection settings and predetermined CN detection settings are less than predetermined thresholds. If true, control continues in step 326. If false, control returns to step 310.

In step 326, the motored pressure ratio is determined based on the measured motored pressure. In step 328, the fired pressure ratio is determined based on the fired pressure. In step 330, the PRD is determined based on the motored pressure ratio and the fired pressure ratio.

In step 332, the PRDA is determined based on the PRD. In step 334, the CN is determined based on the PRDA. In step 336, control determines whether the CN changed in value. If true, control continues in step 338. If false, control continues in step 308. In step 338, the look-up table of the calibration map 210 is changed based on the CN. Control ends in step 308.

Figure 4:
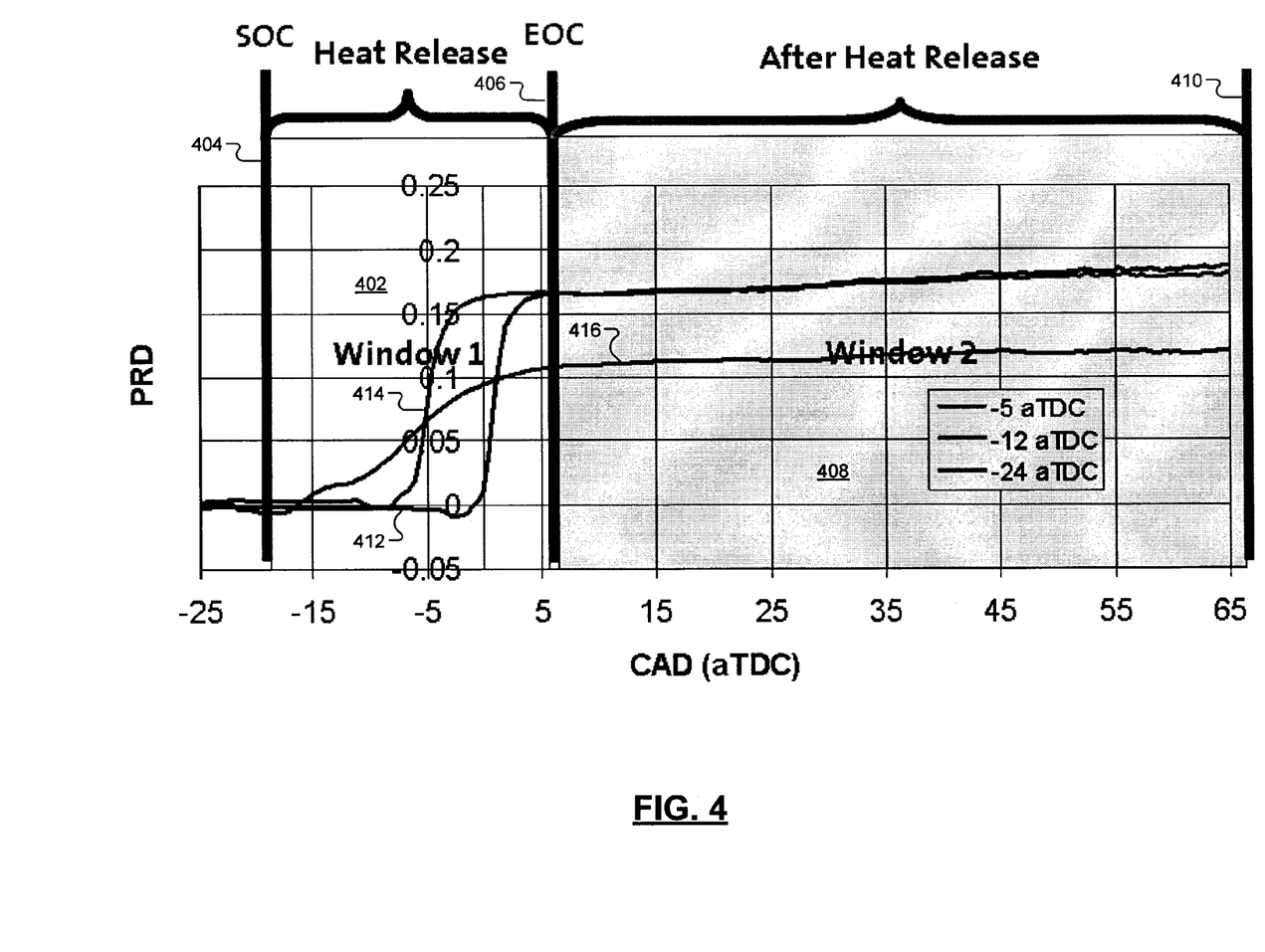
FIG. 4 is a graph depicting a pressure-ratio difference (PRD) versus a crank angle after top dead center (aTDC) for three different pilot timings according to the principles of the present disclosure.

Referring now to FIG. 4, a graph depicting an PRD versus a crank angle in degrees (i.e., CAD) aTDC for three different pilot timings is shown. The graph includes a first crank angle window 402 that starts at a start of combustion (SOC) 404 (i.e., a crank angle aTDC where the PRD starts increasing). The first crank angle window 402 ends at an end of combustion (EOC) 406 (i.e., a crank angle aTDC where heat release or combustion is completed). The graph further includes a second crank angle window 408 that starts at the EOC 406 and that ends at a predetermined crank angle aTDC 410. For example only, the second crank angle window 408 may include less sampling points than the first crank angle window 402 (e.g., approximately up to 6 degree sampling resolution).

The PRD correlates to an amount of heat in a cylinder due to combustion. A first PRD 412 is the PRD when a pilot timing is determined to be −5 degrees aTDC. A second PRD 414 is the PRD when the pilot timing is determined to be −12 degrees aTDC. A third PRD 416 is the PRD when the pilot timing is determined to be −24 degrees aTDC.

During the first crank angle window 402, the PRD is sensitive to the pilot timing (i.e., changes in value based on the pilot timing). During the second crank angle window 408, the PRD approaches a steady final value that corresponds to the end of heat release. The first PRD 412 and the second PRD 414 are insensitive to the pilot timing, while the third PRD 416 is lesser in value due to lower combustion efficiency. Advancing the pilot timing increases ignition delay due to the decreased in-cylinder temperature at the time and thus results in more time for the injected fuel and the air to mix. This leads to a leaner air/fuel mixture being burnt, which impedes heat release as seen in the lesser slope of the third PRD 416 during the first crank angle window 402.

Figure 5:
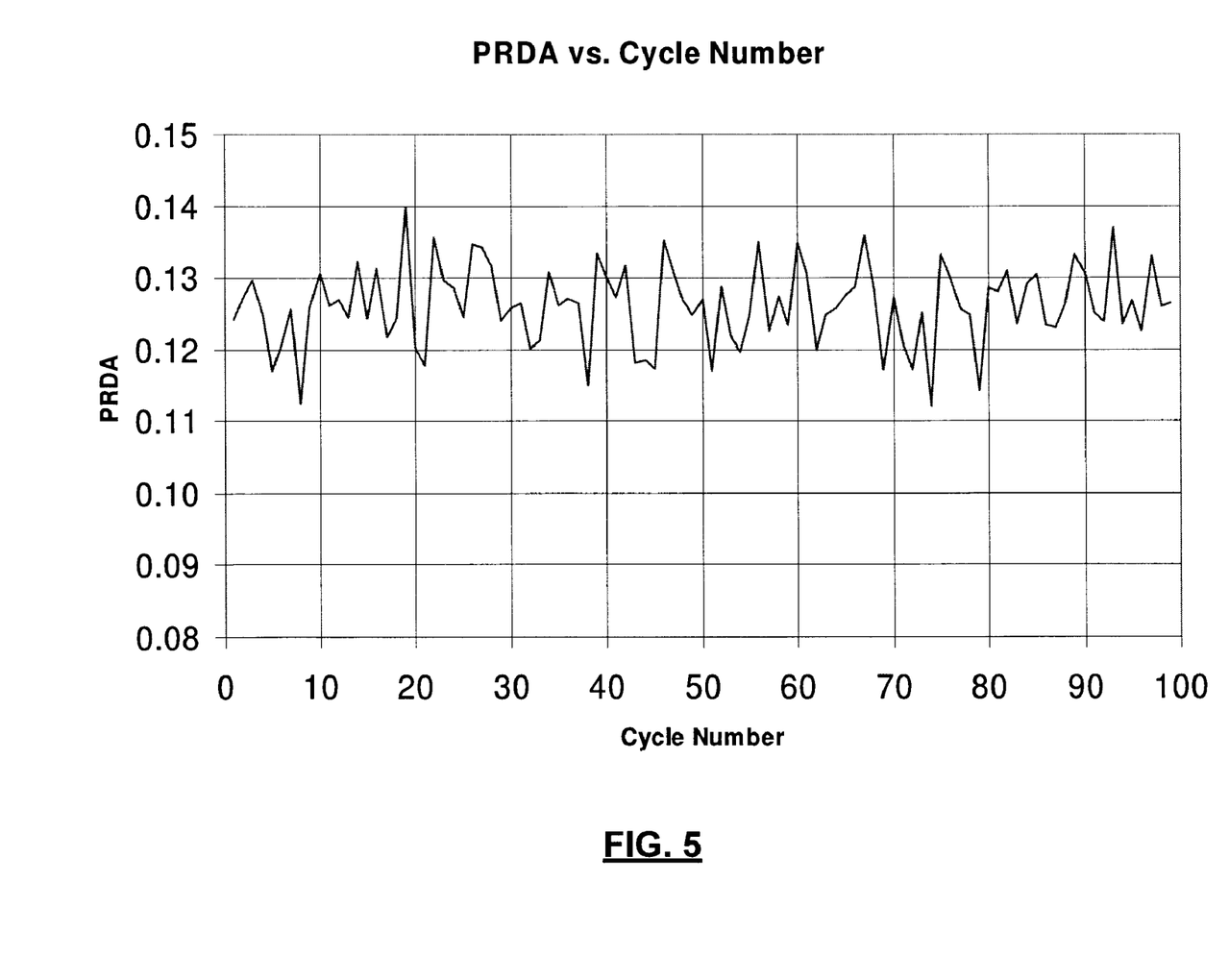
FIG. 5 is a graph depicting a pressure-ratio difference average (PRDA) versus a number of engine cycles according to the principles of the present disclosure.

Referring now to FIG. 5, a graph depicting an PRDA versus a number of engine cycles (i.e., cycle number) is shown. During each engine cycle, the PRDA is determined for all the corresponding samples taken during the second crank angle window 408 of FIG. 4. The graph shows that the PRDA remains stable (e.g., within 10% of the average PRDA).

Figure 6:
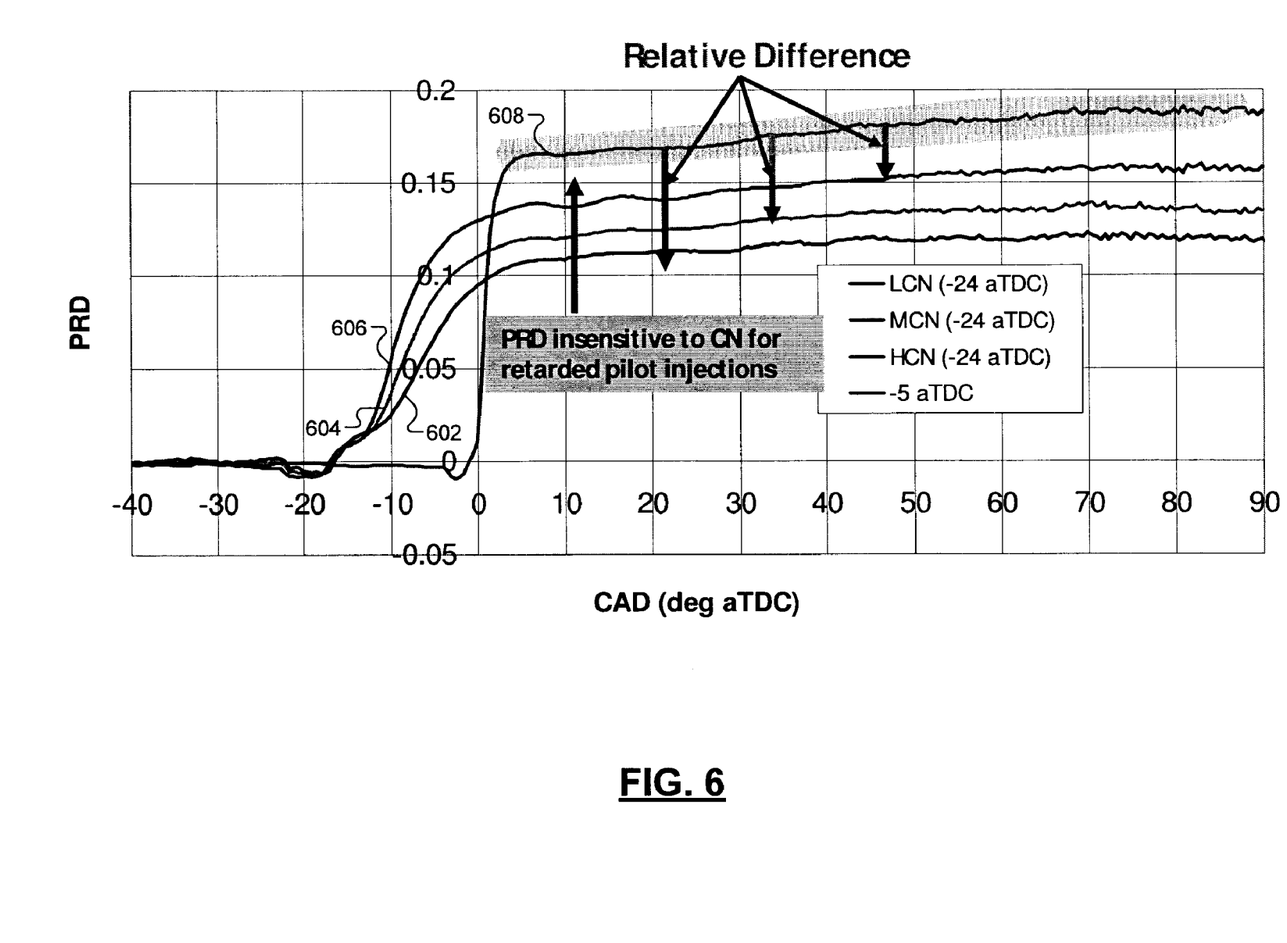
FIG. 6 is a graph depicting an PRD versus a crank angle aTDC for three CI fuels with different cetane numbers (CNs) according to the principles of the present disclosure.

Referring now to FIG. 6, a graph depicting an PRD versus a CAD aTDC for three CI fuels with different CNs is shown. An engine speed is determined to be 680 revolutions per minute (rpm). A fuel rail pressure is determined to be 950 bar. A pilot quantity is determined to be 3 mm$^3$ per fuel injection.

A first PRD 602 is the PRD when an CI fuel comprises a low CN (i.e., LCN) of 42 and the pilot timing is determined to be −24 degrees aTDC. A second PRD 604 is the PRD when an CI fuel comprises a medium CN (i.e., MCN) of 46 and the pilot timing is determined to be −24 degrees aTDC. A third PRD 606 is the PRD when an CI fuel comprises a high CN (i.e., HCN) of 52 and the pilot timing is determined to be −24 degrees aTDC. A fourth PRD 608 is the PRD when the pilot timing is determined to be −5 degrees aTDC.

When the pilot timing is determined to be −5 degrees aTDC, the PRD is insensitive to the CN of the CI fuel. When the pilot timing is advanced to −24 degrees aTDC, the PRD is sensitive to the CN and is lesser in value by a relative difference. Accordingly, to detect the CN, the pilot timing must be advanced to a value that makes the PRD sensitive to the CN. When the CI fuel comprises a higher CN, the CI fuel burns quicker and more completely as seen in the greater slope and the greater values of the third PRD 606.

Figure 7:
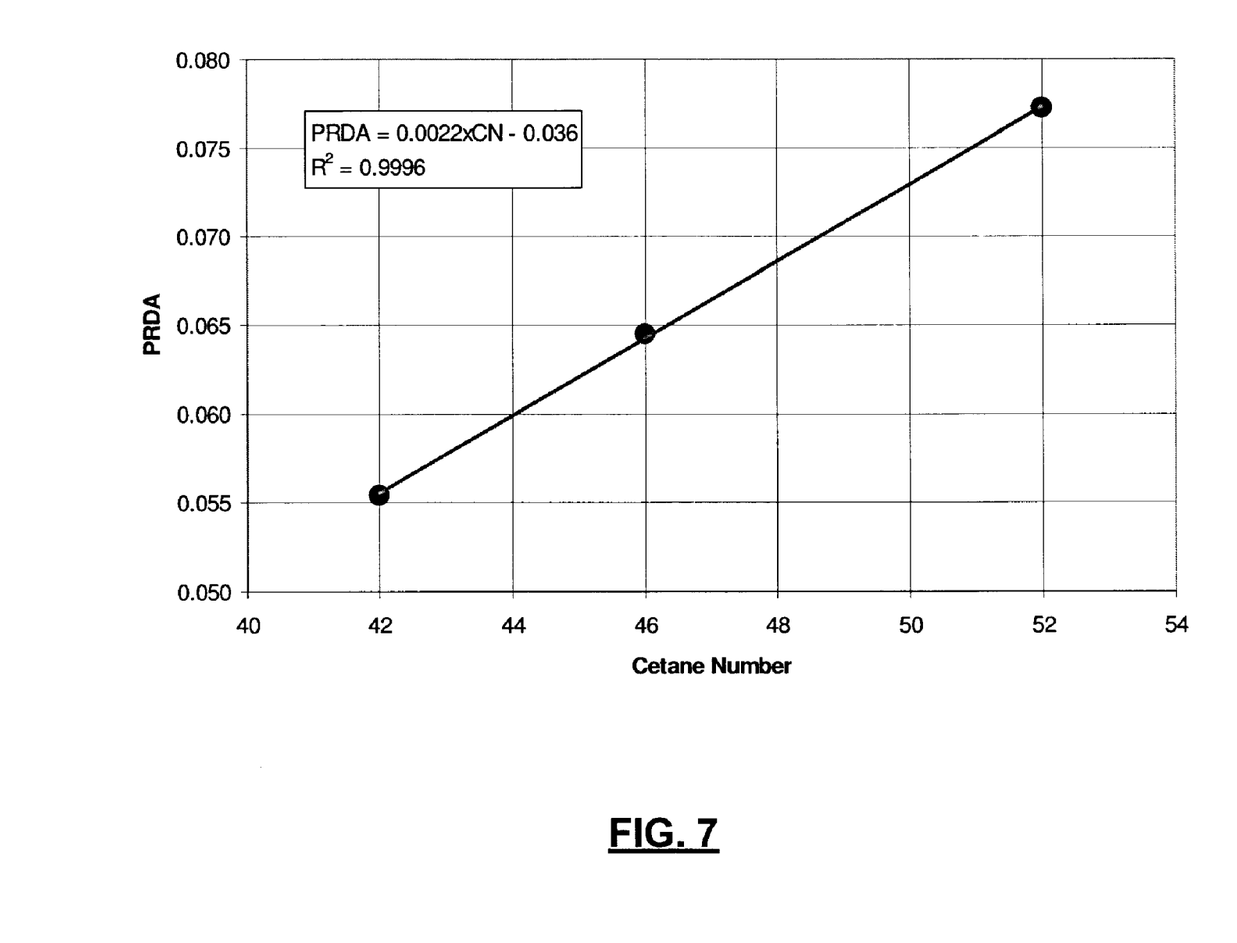
FIG. 7 is a graph depicting an PRDA versus a varied CN according to the principles of the present disclosure.

Referring now to FIG. 7, a graph depicting an PRDA versus an CN of an CI fuel is shown. A crank angle window is determined to be the first crank angle window 402 of FIG. 4. An engine speed is determined to be 680 rpm. A fuel rail pressure is determined to be 950 bar. A pilot quantity is determined to be 3 $mm^3$ per fuel injection. A pilot timing is determined to be −24 degrees aTDC.

The PRDA is sensitive to the CN of the CI fuel. In addition, the PRDA has a linear relationship with the CN. The PRDA increases in value as the CN increases in value. Accordingly, the graph shows that the PRDA may be determined to detect the CN.

Figure 8:
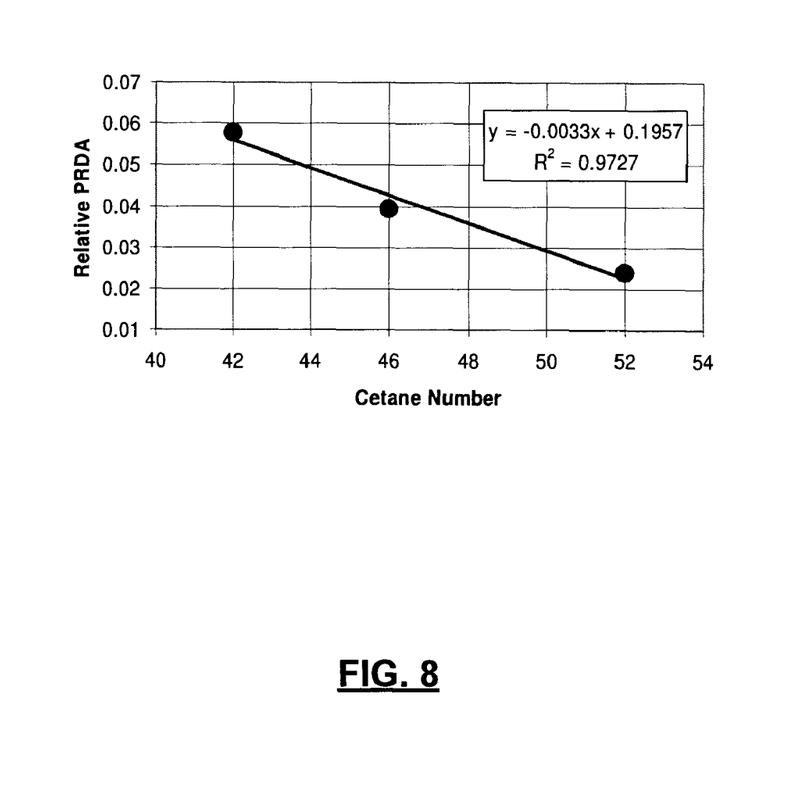
FIG. 8 is a graph depicting a relative PRDA versus a varied CN according to the principles of the present disclosure.

Referring now to FIG. 8, a graph depicting a relative PRDA versus an CN of an CI fuel is shown. A crank angle window is determined to be the second crank angle window 408 of FIG. 4. An engine speed is determined to be 680 rpm. A fuel rail pressure is determined to be 950 bar. A pilot quantity is determined to be 3 $mm^3$ per fuel injection. A first pilot timing is determined to be −24 degrees aTDC, and a second pilot timing is determined to be −5 degrees aTDC.

The relative PRDA is sensitive to the CN of the CI fuel. In addition, the relative PRDA has an inverse linear relationship with the CN. The relative PRDA decreases in value as the CN increases in value. Accordingly, the graph shows that the relative PRDA may be determined to detect the CN.

Figure 9:
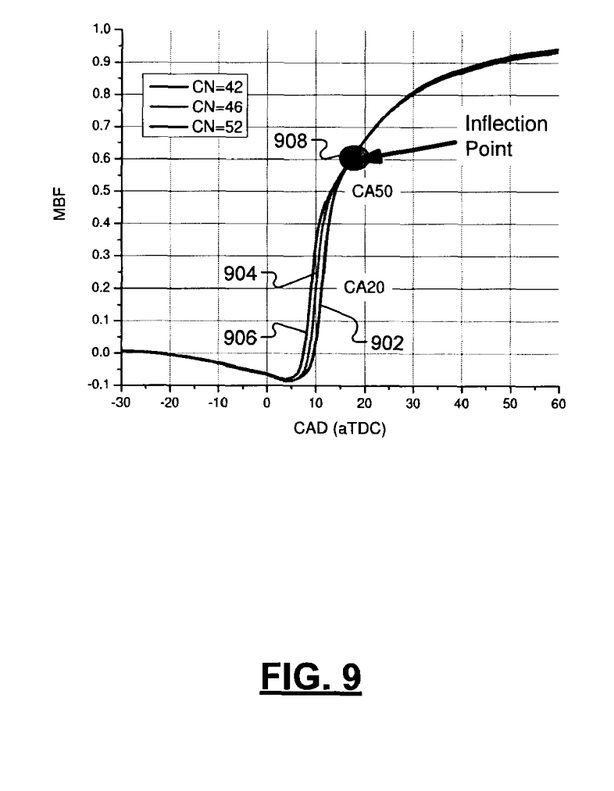
FIG. 9 is a graph depicting a mass burnt fraction (MBF) versus a crank angle aTDC for three CI fuels with different CNs according to the principles of the present disclosure.

Referring now to FIG. 9, a graph depicting a MBF versus a CAD aTDC for three CI fuels with different CNs is shown. A first MBF 902 is the MBF when an CI fuel comprises an CN of 42. A second MBF 904 is the MBF when an CI fuel comprises an CN of 46. A third MBF 906 is the MBF when an CI fuel comprises an CN of 52.

A typical MBF includes one or two inflection points depending on whether there is EGR. For a conventional combustion mode with no or very little EGR, the typical MBF includes two inflection points due to the ratio of premixed (i.e., early burn portion) and diffusion (i.e., later burn portion) burnt fractions. For a conventional combustion mode with high EGR or a premixed charge compression ignition (PCCI) mode, the typical MBF includes an inflection point that is proximate to the CAD aTDC at an MBF of 0.5 (i.e., a CA50).

The MBFs 902, 904 and 906 include an inflection point 908 that is proximate to the CA50. It is not beneficial for the fuel injection control module 206 to use the inflection point 908 as a combustion phasing target to correct for differences between the detected CN and the CN of a look-up table of the calibration map 210. The MBFs 902, 904 and 906 show no differences at the inflection point 908. Instead, the fuel injection control module 206 uses the CAD aTDC at an MBF of 0.2 (i.e., a CA20) or a lesser CAD aTDC as the combustion phasing target. This early burn portion is where the MBFs 902, 904 and 906 show differences due to the CN of the CI fuel.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An engine control system, comprising:
   a fuel diagnostic module that determines a pressure-ratio difference average (PRDA) based on a pressure in at least one cylinder and that determines a cetane number (CN) of a fuel based on the PRDA; and
   a fuel control module that actuates fuel injectors based on the CN.

2. The engine control system of claim 1 wherein the fuel diagnostic module determines the PRDA when a fuel tank is refilled with new fuel.

3. The engine control system of claim 1 wherein the fuel diagnostic module determines the PRDA based on a first ratio of the pressure in the cylinder during an engine cycle in which fuel is not injected to an estimated pressure in the cylinder during the engine cycle in which fuel is not injected.

4. The engine control system of claim 3 wherein the fuel diagnostic module determines the PRDA based on a second ratio of the pressure in the cylinder during an engine cycle in which fuel is injected to the estimated pressure in the cylinder during the engine cycle in which fuel is not injected.

5. The engine control system of claim 4 wherein the fuel diagnostic module determines the PRDA based on an average of a difference between the first and the second ratios.

6. The engine control system of claim 1 wherein the fuel diagnostic module samples the pressure in the cylinder for a range of crank angles of a piston.

7. The engine control system of claim 1 wherein the fuel diagnostic module commands an engine, a fuel system, and the fuel control module to operate based on an engine speed, a fuel rail pressure, an amount of fuel injection, and a timing of fuel injection.

8. The engine control system of claim 1 wherein the fuel diagnostic module commands the fuel control module to operate based on a first timing of fuel injection and a second timing of fuel injection, determines a first PRDA based on the first timing, determines a second PRDA based on the second timing, determines a relative PRDA based on the first PRDA and the second PRDA, and determines the CN based on the relative PRDA.

9. The engine control system of claim 1 wherein the fuel control module determines a timing of fuel injection based on the CN and actuates the fuel injectors based on the timing of fuel injection.

10. The engine control system of claim 1 wherein the fuel diagnostic module determines a timing of fuel injection based on the CN.

11. A method of operating an engine control system, comprising:
    determining a pressure-ratio difference average (PRDA) based on a pressure in at least one cylinder;
    determining a cetane number (CN) of a fuel based on the PRDA; and
    actuating fuel injectors based on the CN.

12. The method of claim 11 further comprising determining the PRDA when a fuel tank is refilled with new fuel.

13. The method of claim 11 further comprising determining the PRDA based on a first ratio of the pressure in the cylinder during an engine cycle in which fuel is not injected to an estimated pressure in the cylinder during the engine cycle in which fuel is not injected.

14. The method of claim 13 further comprising determining the PRDA based on a second ratio of the pressure in the cylinder during an engine cycle in which fuel is injected to the estimated pressure in the cylinder during the engine cycle in which fuel is not injected.

15. The method of claim 14 further comprising determining the PRDA based on an average of a difference between the first and the second ratios.

16. The method of claim 11 further comprising sampling the pressure in the cylinder for a range of crank angles after top dead center of a piston.

17. The method of claim 11 further comprising commanding an engine, a fuel system, and a fuel control module to operate based on an engine speed, a fuel rail pressure, an amount of fuel injection, and a timing of fuel injection.

18. The method of claim 11 further comprising:
commanding a fuel control module to operate based on a first timing of fuel injection and a second timing of fuel injection;
determining a first PRDA based on the first timing;
determining a second PRDA based on the second timing;
determining a relative PRDA based on the first PRDA and the second PRDA; and
determining the CN based on the relative PRDA.

19. The method of claim 11 further comprising:
determining a timing of fuel injection based on the CN; and
actuating the fuel injectors based on the timing of fuel injection.

* * * * *